United States Patent [19]
Borza

[11] Patent Number: 5,859,420
[45] Date of Patent: Jan. 12, 1999

[54] OPTICAL IMAGING DEVICE

[75] Inventor: Stephen J. Borza, Ottawa, Canada

[73] Assignee: Dew Engineering and Development Limited, Ottawa, Canada

[21] Appl. No.: 760,212

[22] Filed: Dec. 4, 1996

[51] Int. Cl.[6] .................................................. G01B 11/124
[52] U.S. Cl. ...................... 250/208.1; 250/216; 250/556; 382/127
[58] Field of Search ................................. 250/208.1, 216, 250/227.28–227.32, 556; 283/68–70, 78; 356/71; 382/124–127

[56] References Cited

U.S. PATENT DOCUMENTS

| | | | |
|---|---|---|---|
| 3,875,420 | 4/1975 | Ryden et al. ......................... | 250/208.1 |
| 4,695,716 | 9/1987 | Tandon et al. .......................... | 250/211 |
| 5,432,334 | 7/1995 | Nelson et al. ....................... | 250/208.1 |
| 5,627,363 | 5/1997 | Paxman et al. ...................... | 250/208.1 |

*Primary Examiner*—Stephone Allen
*Attorney, Agent, or Firm*—Neil Teitelbaum & Associates

[57] ABSTRACT

An optical imaging device such as a fingerprint imager or a CCD camera, has a reduced size due to the provision of multiple lenses which are associated with respective CCDs. The optical path between the lenses and the CCDs is shortened. In a fingerprint version of the device, a staircase-shaped prism is advantageously used in combination with the multiple lens and multiple CCD arrangement. An alignment means is provided to facilitate the reconstructing the image out of partial images created by separate CCDs.

19 Claims, 4 Drawing Sheets

OPTICAL IMAGING DEVICE

FIELD OF THE INVENTION

This invention relates generally to imaging devices and more particularly to optical devices for imaging fingerprints, CCD cameras and the like.

BACKGROUND OF THE INVENTION

In a known fingerprint detection apparatus, the finger under investigation is usually pressed against a flat surface, such as a side of a prism or a glass plate, and the ridge and valley pattern of the finger tip is illuminated with an interrogating light beam. In the optical devices which employ prisms, the prism has a first surface upon which a finger is placed, a second fingerprint viewing surface disposed at an acute angle to the first surface, and a third illumination surface through which light is directed into the prism. The incident beam of light is reflected from the first surface and exits through the fingerprint viewing surface. An image producing lens or lens system is provided for receiving the beam reflected from the valleys of the subject fingerprint and for producing an image of the subject fingerprint at an image sensor, e.g. a charge coupled device (CCD) or the like for converting the fingerprint image into an electric signal. An amplifying/analysing signal processing circuit and a monitor for displaying the fingerprint image are also provided. In some cases, the illumination surface is at an acute angle to the first surface, as seen for example, in U.S. Pat. Nos. 5,187,482 and 5,187,748. In other cases, the illumination surface is parallel to the first surface, as seen for example in U.S. Pat. Nos. 4,924,085, 5,109,427 and 5,233,404.

Fingerprint identification devices of this nature are generally used to control building-access or information-access of individuals to buildings, rooms, and devices such as computer terminals.

One of the problems associated with fingerprint sensors concerns the reliable and accurate transformation of ridge and valley pattern of the finger tip into electrical or optical signals to be stored in a digital format. Optical systems as described above, for example using a prism, require sophisticated equipment and tend to be bulky and costly.

It is extremely difficult to produce a single large image sensor, for example comprised of a single piece of silicon (called a chip or a die) cut from a silicon wafer. Fabricating a device with a large area is impractical due to the cost of manufacture and lower manufacturing yields for larger dies than for smaller dies. When square or rectangular dies are cut from a substantially round silicon wafer, there is less loss at the edges of the wafer when small dies are cut than when large dies are cut. Faults within a die often render the die unusable. As an entire die is discarded, it is evident that smaller dies result in less wasted material. This is illustrated hereinbelow.

Furthermore, current, conventional photolithographic systems are typically equipped for the production of dies that have a maximum dimension of about 0.4 inches to 0.5 inches. In optical CCDs, larger die areas capture more light and provide higher resolution output. A higher yield due to smaller dies results in lower cost.

OBJECT OF THE INVENTION

Thus, in an attempt to overcome these and other limitations of known prior art devices, it is an object of this invention to provide a more compact and robust optical imaging device.

It is an object of the invention to provide a device that utilizes a plurality of small dies arranged in an array to overcome some of the aforementioned limitations of utilizing, a single large semiconductor die.

It is a further object of the invention to provide an optical imaging device that is relatively inexpensive and practicable to manufacture.

SUMMARY OF THE INVENTION

In accordance with the invention, there is provided an imaging device comprising:

a source of light for illuminating an object to be imaged so that a light beam derived from the object and carrying its image is formed, an image focusing means for dividing the derived light beam into a plurality of sub-beams carrying subimages of the object, and for focusing each of the sub-beams on a focal plane, and a plurality of image sensors corresponding to the plurality of sub-beams, each image sensor disposed in a focal plane corresponding to one of the sub-cams, for receiving and converting a corresponding subimage into an electric signal.

The device may further comprise processor means for amplifying and analyzing said subimages, including optionally integrating said subimages into a full image of the object, and for visually displaying the subimages and the entire image.

The image focusing means may be a plurality of lenses, either separate or connected together. The image sensor may be a charge coupled device (CCD) or another equivalent means.

The focusing means may carry thereon or therein a reticle disposed such as to be optically transmitted with at least some of said focused sub-beams onto a corresponding image sensor or sensors to serve as alignment marks.

In one aspect of the invention, there is provided an imaging device for use particularly as a fingerprint imager, the device comprising a transparent prism having a first surface to which an object to be imaged is contacted.

a source of light for illuminating the object so that a light beam derived from the object and carrying its image is formed, an image focusing means for dividing the derived light beam into a plurality of sub-beams carrying subimages of the object, and for focusing each of the sub-beams on a focal plane, and a plurality of image sensors corresponding to said plurality of sub-beams, each image sensor disposed in a focal plane corresponding to one of the sub-beams for receiving and converting a corresponding subimage into an electric signal.

Further, the imaging device may comprise processor means for amplifying and analyzing said subimages, including optionally integrating said subimages into a full image of the object, and for visually displaying said subimages and said image.

As above, the focusing means of this embodiment may be a plurality of lenses, either separate or connected together. The image sensor may be a charge coupled device (CCD) or another equivalent means.

BRIEF DESCRIPTION OF THE DRAWINGS

Exemplary embodiments of the invention will now be described in conjunction with the following drawings. in which.

DETAILED DESCRIPTION OF THE INVENTION

Figure 1:
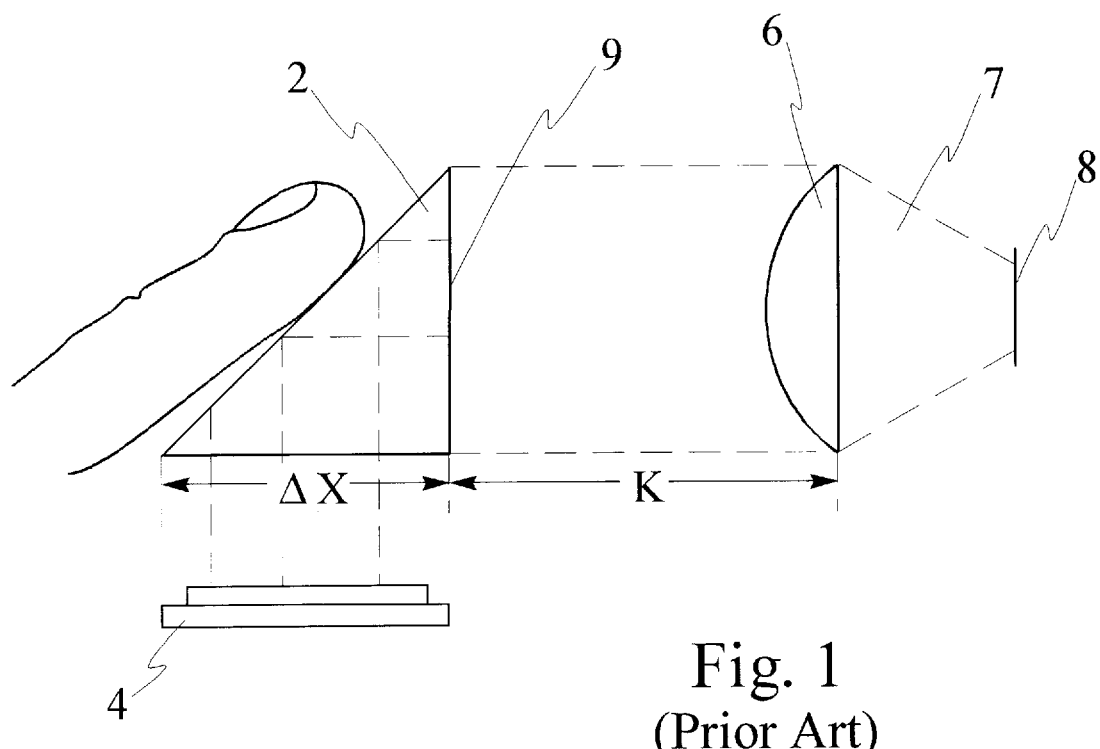
FIG. 1 is a side view of a prior art apparatus for identifying fingerprints.

A known optical fingerprint imaging device shown schematically in Fig. I has a prism 2 and a light source 4 for emitting a light beam onto a surface of the prism on which a finger is placed. A lens 6 is provided for receiving the reflected light beam from the subject fingerprint and for producing an image of the fingerprint on an image sensor 8, typically a charge coupled device (CCD) array. An amplifying circuit and monitor, not shown, are also part of the device.

The size of the prism is determined by the size of a typical human finger to be analyzed. Assuming a right angle prism and the angle between the finger-receiving surface and the viewing surface 9 being about 45 degrees, the minimum size of the illuminating surface $\Delta x$ is also determined. It is known that the distance between the prism and the lens 6 should be larger than the size $\Delta x$ of the illuminating surface. Since it is advantageous and desirable to reduce the overall size of the device, it follows that it is also desirable to reduce the size $\Delta x$.

Figure 3:
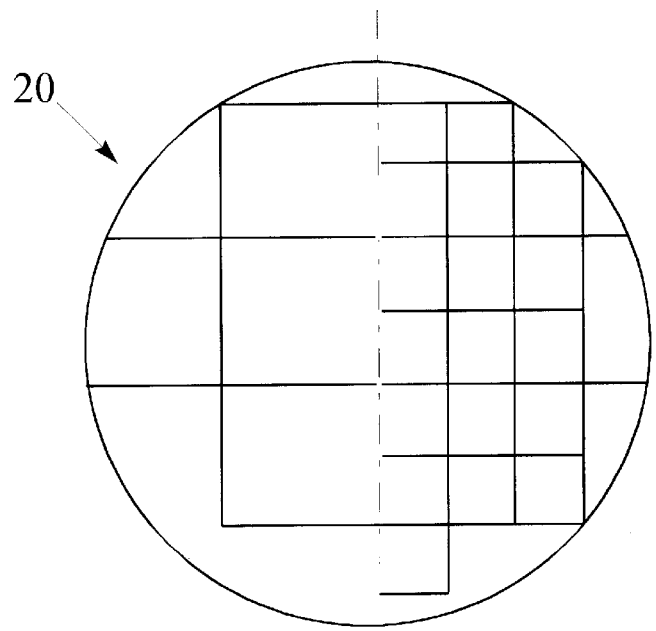
FIG. 3 is a schematic view of a semiconductor wafer, illustrating the space saving by a finer division of the wafer.

As discussed in the background of the invention, large single chip devices are difficult and costly to manufacture. FIG. 3 illustrates a 28% increase in yield from a wafer 20 using, 0.375×0.375 inch chips (shown as rectangles on the right of FIG. 3) over 0.75×0.75 inch chips (shown on the left of the figure).

Figure 2:
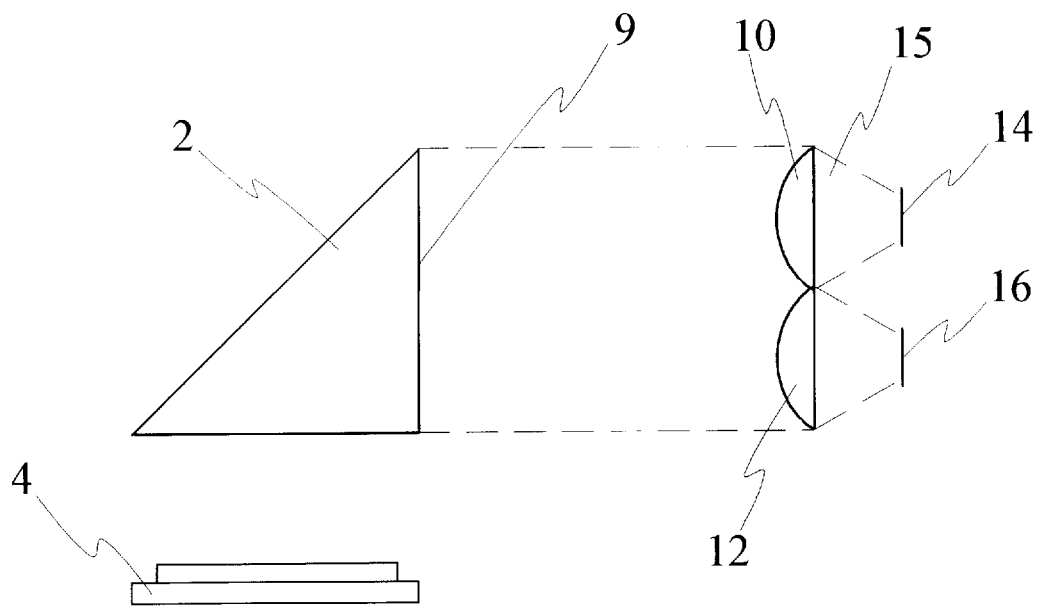
FIG. 2 is a schematic view of one embodiment of the device of the invention.

As illustrated in FIGS. 1 and 2, the height of an optical fingerprint imager is a function of a trapezoid formed by the CCD at one base thereof and the lens at the other base thereof, assuming lenses of comparable focal power. As can be seen in FIG. 1 in comparison with FIG. 2, the large base (the diameter of the lens 6) gives rise to a large trapezoid 7 compared to the two trapezoids 15 defined by the lenses 10, 12 and the corresponding CCD arrays 14, 16.

In the optical system of FIG. 2, only two lenses are shown. Actually, in order to better cover the beam reflected from the object and passing through the viewing surface 9, the system has four lenses, each defining a separate optical path. These four separate optical paths are formed by the use of four lenses and four corresponding CCDs. All the lenses have a focusing length such as to focus their part of the image (a subimage) in a focal plane in which the corresponding CCD element is disposed. In FIG. 2, the focal plane is common for all the lenses 10, 12; as will be discussed hereinbelow, this is not always necessary.

The CCDs 14, 16 may be smaller than the CCD 8 of FIG. 1 and still maintain the resolution of the CCD 8, or they may be of equivalent size to the size of the single CCD 8 and thus increase resolution substantially. In either case, the total size of the optical imaging device of FIG. 2 is reduced compared to that of FIG. 1 for the resolution obtained.

The number of lenses is not limited to four. According to the invention, any practical plurality of lenses disposed such as to focus a part of the reflected light carrying the image of the object may be employed.

Figure 4:
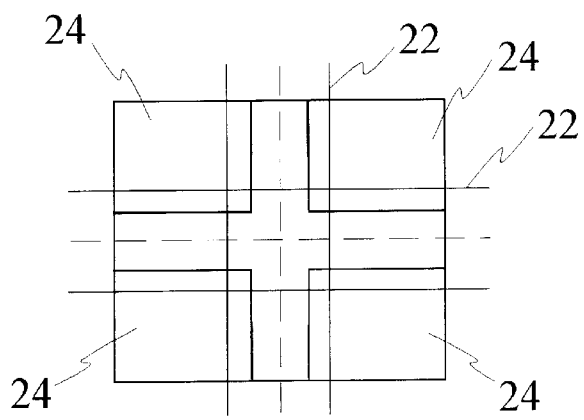
FIG. 4 is a plan view of a multiple image sensor of the invention.

It is known in the art that the pattern of electrical charges created on CCD chips can be transmitted sequentially out of the chip to be reassembled by an analyzing circuit e.g. on a readout screen. According to the present invention wherein a plurality of chips is employed, it is advantageous to provide alignment marks on separate subimages to assist in a precise reassembly of the separate subimages into a true picture c.o. a fingerprint image. Such alignment marks, as illustrated in FIG. 4, may take the form of crosshairs or other indicia. To create such alignment marks 22 on an image sensor. a reticle is provided on at least one of the lenses. The sub-beam carrying a subimage is then also transmitting the reticle (e.g. crosshairs) into the corresponding image sensors (area CCDs 24). Knowing the predetermined positioning of the reticle (crosshairs) on the lens or lenses. it is easy for those skilled in the art to reassemble the image on the display screen. The fact that the image will carry the corresponding alignment reticle or indicia is either very important or secondary, depending on the application. For the purpose of simply determining a presence or absence of a pattern such as a fingerprint, the presence of alignment lines may well be negligible or of minor importance. It would of course disqualify a video film or the like.

FIG. 4 shows the four chips 24 assembled in a common plane to receive the subimages from the four lenses 10, 12 of FIG. 2, the focal length of all the four lenses being identical. As will be demonstrated hereinbelow, this is not a prerequisite. However, FIG. 4 is an example of a better use of the wafer. It is, arguably, more economical to cut four small chips (shown on the right side of FIG. 3) and to attach them to a common backing for the purpose of the embodiment of FIG. 2 (elements 14 and 16) than to manufacture a single large chip equivalent to the size of four chips 24.

Figure 5:
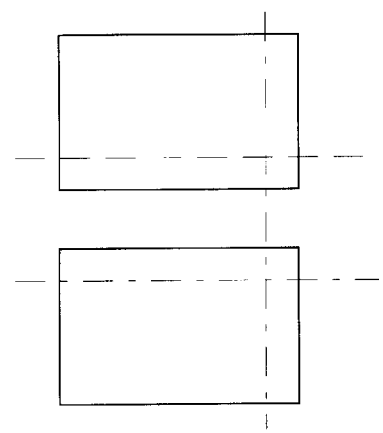
FIG. 5 is a view explaining the use of the alignment pattern.

FIG. 5 illustrates how two subimages can be reassembled by aligning their common features (crosshairs lines).

It will be noted that the subimages can be assembled in an abutting manner or with an overlap. As remarked above, any small deterioration of the image quality may be secondary for the purpose of identifying the presence or absence of a pattern (e.g. a fingerprint), a predetermined design or mark.

As discussed in conjunction with FIGS. 1 and 2, it will be appreciated that the provision of four lenses 10, 12 instead of one lens 6. may shorten the optical path between a lens and the corresponding CCD chip by 50%. subject to the comparability of the optics. By the same token, the single lens 6 of FIG. 1 may be replaced by another number of lenses, e.g. nine, in a side-by-side or an overlapping pattern, to cover the beam of light reflected from the object under investigation. It will be evident to those skilled in the art that an arrangement with nine lenses would result in the shortening of the optical path between a lens and the corresponding image sensor by 66.7%. Such shortened optical paths will in turn result in a reduction of the overall dimensions of the device.

Figure 6:
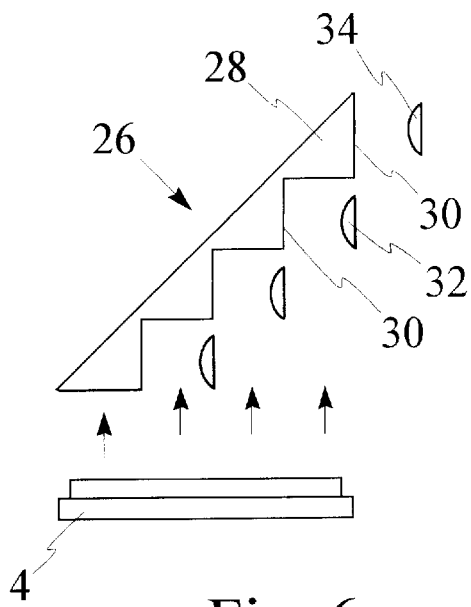
FIG. 6 is a schematic view of an embodiment of the device of the invention using a multiprism.
Figure 7:
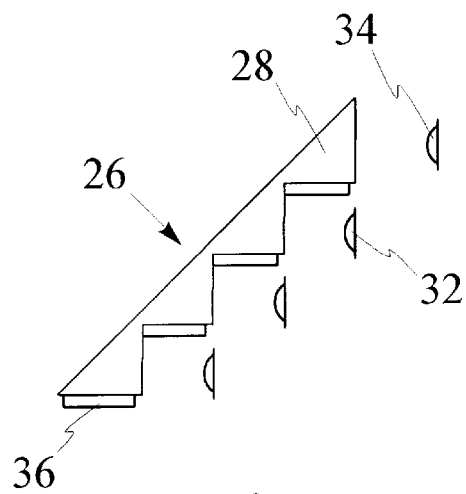
FIG. 7 is a schematic view of another embodiment using a multi-prism, FIG. 8. is a schematic view of still another embodiment using a multi-prism.
Figure 8:
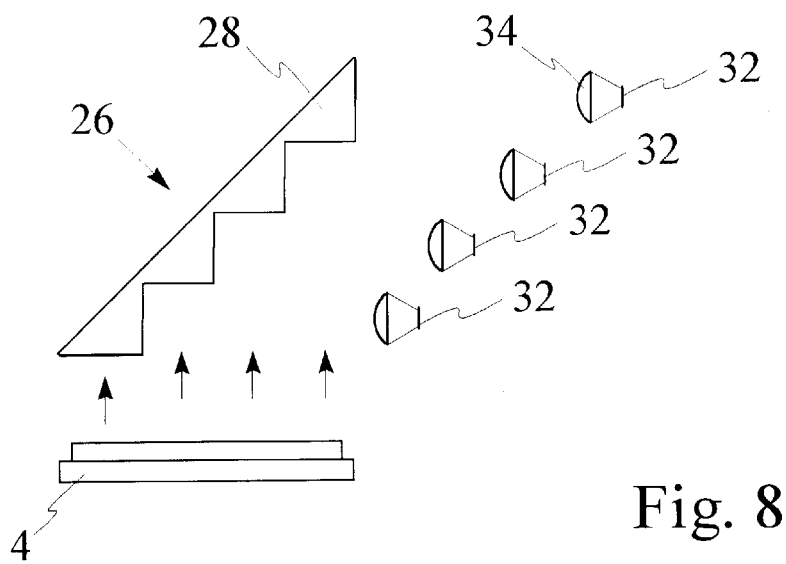

In exemplary embodiments of the invention, a conventional prism is replaced by a multi-prism 26 shown in FIGS. 6, 7 and 8. The staircase-shaped prism, shown in a side view, may be designed in a single piece or as a plurality of small prisms 28 secured to a common backing. As seen in FIG. 6, each small prism 28 is illuminated with a portion of the light emitted by the source 4, and the light is reflected from an object. e.g. a fingerprint pattern, shown in FIG. 1, applied to the slanted face of the prism 26. The reflected light passes through the viewing faces 30 onto image sensors 32, each having a lens 34 applied directly thereto to simplify the design and to minimize the size of the device. The analyzing circuit and the display are not illustrated.

A somewhat different embodiment is illustrated in FIG. 7. the difference being in that the single source of light 4 is replaced by separate light sources applied directly to the illuminating ("bottom") surfaces of the small prisms 28.

It will be recognized that the embodiment of FIG. 6 gives rise to some banding. The light beam emitted by the source 4 towards the slanted face of the multiprism 26 is partially obscured by the CCD/lens sets 32, 34. The resulting shading creates banding on the subimages provided by the CCDs 32 on the display. This drawback is a trade-oft for a significant reduction in size of the design of FIG. 6 as compared with the conventional design of FIG. 1. It will be noted that the design of FIG. 7 does not eliminate the shading completely. but it does contribute to space saving as it eliminates the outside light source in favor of "integrated" sources of light 36.

In the embodiment of FIG. 8, shading by the lenses and CCDs is eliminated at the expense a somewhat larger overall size of the setup. It will be noted that the overall size still offers a reduction in size over the conventional design of FIG. 1 owing to both the staircase prism design and the reduction of the distance between the lenses and the image sensors (CCDs).

Figure 9:
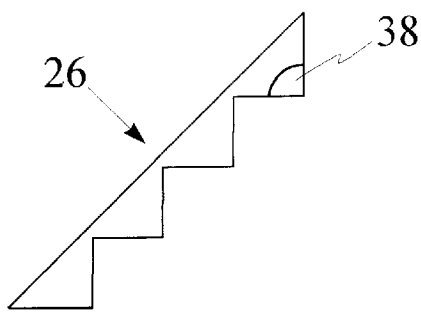
FIG. 9 illustrates a multi-prism with obtuse angles.

In the above-discussed embodiments of FIGS. 2, 6, 7 and 8, the prism is a right-angle prism or is comprised of a plurality of right-angle sub-prisms 28. It is conceivable to employ prisms with sharp or obtuse angles between the illuminating surface and the object viewing face. An example of such a prism is illustrated in FIG. 9 where the angle 38 is greater than 90 degrees. This allows more freedom in geometric design of the device.

Figure 10:
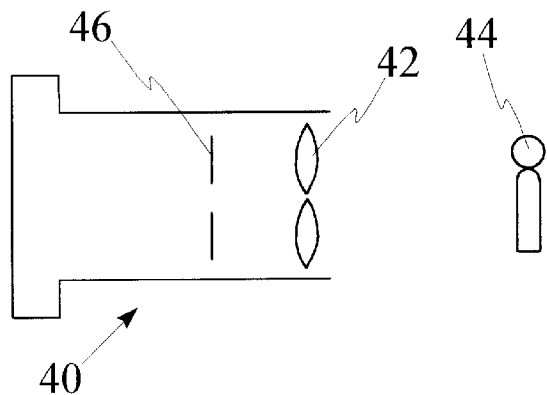
FIG. 10 is a schematic side view of a CCD camera embodying the invention.
Figure 11:
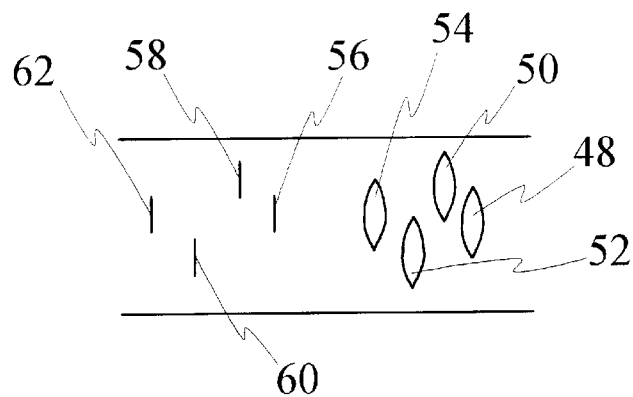
FIG. 11 is a side view of another CCD camera of the invention, with overlapping lenses.
Figure 12:
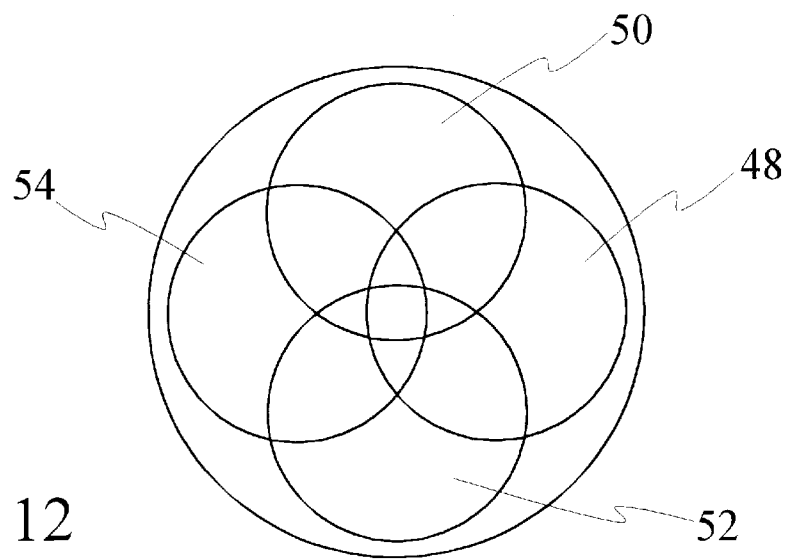
FIG. 12 is a front view of the camera of FIG. 11.

As represented schematically in FIGS. 10, 11 and 12, the invention may be employed in a device where a prism is not necessary. A CCd camera 40 has a plurality of lenses 42 which each receive a subimage of an object 44 illuminated by an outside light source, not shown. The subimage from each lens is focused on a corresponding image sensor 46 which is disposed in a focal plane of its respective lens. Due to the shortened light path between the lenses 42 of FIG. 10 and the corresponding image sensors (e.g. area CCDs), as explained hereinabove, the overall size of the camera may be reduced.

As mentioned above, the lenses may be disposed in a common plane such that their respective subimages are also focused in a common plane. This, however, may give rise to a relatively large image loss as the area of a circle cannot be fully covered with smaller abutting circles. This problem can partly be solved, as shown in FIGS. 11 and 12 by providing overlapping lenses. The axial displacement of the lenses 48, 50, 52 and 54, shown in FIG. 11, results in a corresponding axial shift of the respective CCD sensors 56. 58. 60 and 62. In the front view of FIG. 12, it can be seen that the circular area corresponding to a single lens of a conventional camera is covered to a substantial decree due to the partial radial overlap of the four lenses. It will be understood, however, that the provision of overlapping lenses as shown in FIGS. 11 and 12 may cause certain image distortions which may require compensating in a known manner.

Again, due to the sequential transmission of subimages from the separate image sensors of FIGS. 6–12, it is advantageous, where permitted by image quality requirements, to apply a reticle such as crosshairs, on or in the lenses in a manner to enable the reticle to be transmitted with the subimages onto the respective image sensors to be electronically reassembled on a display.

Alternatively, image loss can be reduced through the use of wide angle lenses enabling the camera to capture 4 overlapping subimages. The use of wide angle lenses for a camera embodiment of the device results in a distortion of each subimage which, when desirable. can be reduced through digital signal processing of the subimages prior to or after reconstruction of the image.

Further, the use of a wide angle lens in the apparatus of FIGS. 2, 6. 7, or 8 reduces the effect of banding and with sufficient light reaching a CCD lens each point on a fingerprint (or other object imaged), an image is reconstructed absent banding. Such an image is reconstructed in dependence upon subimage overlap. Alternatively, such an image is reconstructed in dependence upon a reticle or other indicum. The resulting image is of an object resting on the prism and therefore at a known distance from the lens. This known limitation facilitates image reconstruction and reduction of distortion when desirable.

Numerous other embodiments may be envisaged without departing from the spirit and scope of the invention.

What I claim is:

1. An optical imaging device comprising:
   a source of light for illuminating an object to be imaged so that a light beam derived from said object and carrying its image is formed,
   image focusing means for dividing said derived light beam into a plurality of focused sub-beams carrying subimages of said object, and for focusing each of said sub-beams on a focal plane, and
   a plurality of charge coupled device array image sensors corresponding to said plurality of sub-beams, each image sensor disposed in a focal plane corresponding to one of said sub-beams, for receiving and converting a corresponding subimage into an electric signal and each charge coupled device array comprising an array of m x n charge coupled devices where m and n are both greater than 1.

2. The imaging device of claim 1 further comprising processor means for reassembling said subimages into a full image of said object.

3. The device of claim 1 wherein said image focusing means is a plurality of lenses, each lens for focusing a sub-beam the plurality of focused sub-beam on an array from the plurality of charge coupled device arrays.

4. The device of claim 2 further comprising alignment means for optically providing a predetermined alignment pattern in at least some of said subimages to facilitate a reassembly of said subimages into the full image of said object.

5. The device of claim 4 wherein said alignment means is a reticle associated with one or more of said focusing means.

6. The device of claim 3 wherein said plurality of lenses comprises lenses which are axially displaced relative to each other.

7. The device of claim 6 wherein said lenses are disposed such that they partly overlap radially each other.

8. An optical imaging device comprising:

a transparent prism having a first surface to which an object to be imaged is contacted, a source of light for illuminating said object so that a light beam derived from said object and carrying its image is formed, an image focusing means for dividing said derived light beam into a plurality of focused sub-beams carrying subimages of said object, and for focusing each of said subbeams on a focal plane, and a plurality of image sensors corresponding to said plurality of sub-beams, each image sensor disposed in a focal plane corresponding to one of said sub-beams. for receiving and converting a corresponding subimage into an electric signal.

9. The device of claim 8 further comprising processor means for reassembling said subimages into a full image of the object.

10. The device of claim 8 wherein said focusing means is a plurality of lenses.

11. The device of claim 8 wherein said image sensors are charge coupled devices.

12. The device of claim 8 wherein the size of said prism is adapted to receive a finger for fingerprinting purposes.

13. The device of claim 8 wherein said prism comprises an object receiving face, a plurality of illuminating surfaces for illuminating said object with said light source, and a plurality of viewing faces corresponding to said illuminating surfaces for transmitting therethrough said light beam derived from said object.

14. The device of claim 13 wherein said illuminating surfaces and said corresponding viewing faces form obtuse angles.

15. The device of claim 13 wherein said illuminating surfaces and said corresponding viewing faces form sharp angles.

16. The device of claim 13 wherein a separate light source is associated with each of said illuminating surfaces.

17. An optical imaging device comprising;

an array of charge coupled device arrays having a predetermined spatial relation to each other for sensing at least some of an incident optical image, each charge coupled device array comprising a two-dimensional array of sense elements for sensing light incident upon the elements; and means for directing different portions of an image incident upon the means toward each of the charge coupled device arrays.

18. An optical imaging device as defined in claim 17 further comprising a processor means for reconstructing the image in a predetermined fashion.

19. An optical imaging device as defined in claim 17 wherein the means for directing comprises a plurality of lenses, each lens for focusing a sub-beam from the plurality of focused sub-beams on a array from the plurality of charge coupled device arrays.

* * * * *